Figure 1:
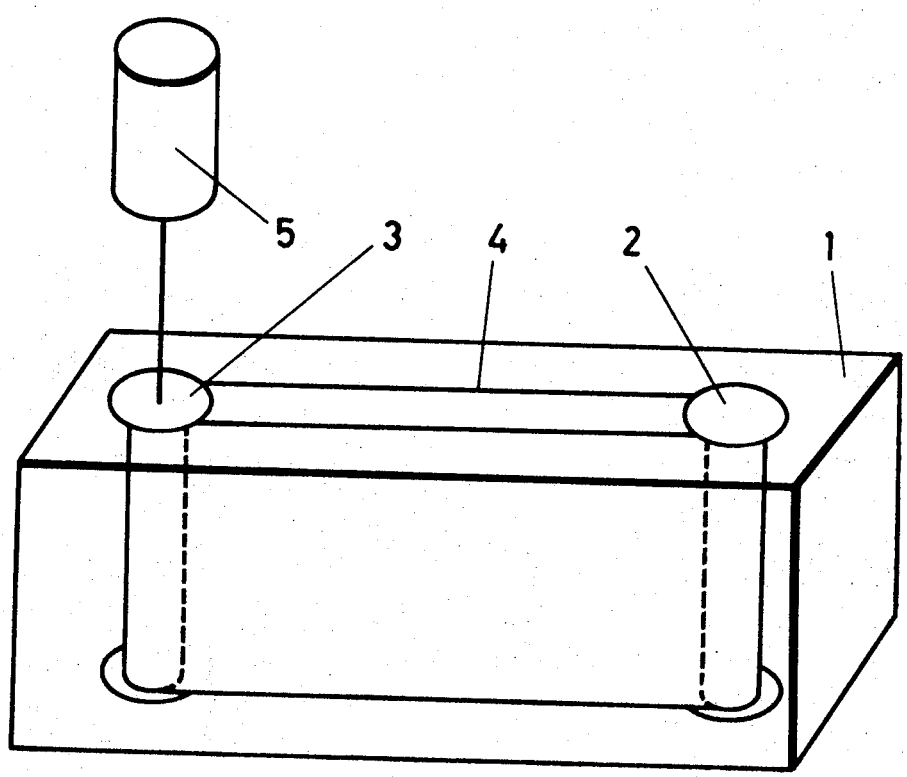

United States Patent [19]
Gassmann et al.

[11] 3,753,652
[45] Aug. 21, 1973

[54] METHOD OF RECORDING LIQUID FLOW OVER A SOLID SURFACE

[75] Inventors: Hans Ulrich Gassmann, Fribourg; Ulrich Frauchiger, Marly, both of Switzerland

[73] Assignee: Ciba-Geigy AG, Basel, Switzerland

[22] Filed: Feb. 3, 1971

[21] Appl. No.: 112,155

[30] Foreign Application Priority Data
Feb. 13, 1970  Switzerland........................ 2135/70

[52] U.S. Cl.............................. 23/230 R, 8/4, 8/17, 23/230 A, 23/253 TP, 95/89 R, 96/48 R
[51] Int. Cl....... D06p 3/12, G01n 33/00, G03c 5/24
[58] Field of Search...................... 23/230 R, 230 L, 23/253 TP, 230 A; 116/114 AM; 73/61.1 C; 95/89 R

[56] References Cited
UNITED STATES PATENTS

| | | |
|---|---|---|
| 1,895,760 | 1/1933 | Hunt.................................. 95/89 R |
| 3,515,050 | 6/1970 | Attridge et al...................... 95/89 R |
| 3,559,555 | 2/1971 | Street................................... 95/89 R |
| 2,785,958 | 3/1957 | Copenhefer et al.............. 23/230 R |
| 3,544,484 | 12/1970 | Roth ........................... 23/253 TP X |
| 3,597,263 | 8/1971 | Bancroft et al. ............ 23/253 TP X |
| 2,708,896 | 5/1955 | Smith et al.................. 23/253 TP X |
| 3,350,278 | 10/1967 | Guetton et al.............. 23/253 TP X |

*Primary Examiner*—Joseph Scovronek
*Attorney*—Harry Goldsmith, Joseph G. Kolodny and Mario A. Monaco

[57] ABSTRACT

This invention relates to a method of recording liquid flow over a solid surface: The solid surface is covered with a thin coating film which contains a diffusible substance. A liquid is caused to flow over the coated surface. The liquid contains in dissolved form a substance which reacts with said diffusible substance to yield a reaction product, preferably a colored reaction product, that is visible in the coating and sparingly soluble in the flowing liquid. The method is particularly useful for testing the conditions in photographic processing baths in a simple manner.

11 Claims, 2 Drawing Figures

METHOD OF RECORDING LIQUID FLOW OVER A SOLID SURFACE

This invention relates to a method of recording liquid flow over a solid surface.

In technical processes in which a liquid acts on a solid body, the rate of reaction is often dependent on the rate at which the liquid flows over the surface of the body. It is often desirable in these cases to know the rate of flow over different parts of the surface of the solid body. On the basis of this knowledge, the flow can be controlled by suitable design of the body surface or by arrangement of the flow-producing apparatus. In particular, it is desirable in many cases to achieve the greatest possible uniformity in the rate of flow over the entire surface of the solid body. Such requirements are encountered particularly in the treatment of textile fabrics and the processing of exposed photographic material.

Various methods of measuring the rate of flow of a liquid over a surface are already known. One method, for example, involves measurement of the heat transfer dependent on the rate of flow by means of thermistors mounted at different locations on the surface. However, such measurements involve much work and do not provide a complete record of the flow conditions, because they can only be carried out at localised positions.

It has now been discovered that an overall record of liquid flow over a surface can easily be recorded in visible form, and the rate of flow can be measured at each surface element, if the surface is thinly coated with a film containing a freely diffusible substance, which in conjunction with a second substance dissolved in the liquid produces a reaction product visible in the coating and not readily soluble in the flow liquid. The reaction product is deposited in the parts of the coating surface over which the liquid flows.

The coating material must allow the liquid to penetrate easily by diffusion, i.e. it should swell easily in the liquid without being dissolved in it. Hydrophilic, gel-forming colloids, especially hydrophilic compounds of high-molecular weight that are capable of swelling in water, but are not soluble in water at the application temperature, preferably room temperature, e.g. 15° to 25°C., such as proteins, methylcellulose, polyvinyl alcohol and similar compounds, which can be treated by cross-linking or hardening agents to prevent dissolution of the coating, are particularly suitable as coating-forming substances for use in aqueous media. Proteins such as casein and, in particular, gelatin are preferred.

The formation of dyestuffs from two components, one of which is in the coating and the other in the liquid, is primarily suitable as a reaction which produces the optical contrast, e.g. the formation of azo dyestuffs from a diazo compound and coupling component or the formation of coloured inorganic complexes from two components. If the carrier and coating, for example, are transparent an optical contrast can also be caused by formation of a colourless product, e.g. by the precipitation of insoluble inorganic salts.

To ensure that a stable record is formed in the coating, the reaction product of the two components producing the optical contrast must be insoluble and incapable of diffusing in the coating. For example, a clear flow record can be obtained with a gelatin coating containing phenolphthalein in an alkaline liquid, but it is stable only for a short time. Differences in the colour intensity are soon obscured in this case, and a uniform red surface colour is finally obtained.

Generally speaking, it should be possible for the two reaction components to diffuse freely in the coating. If, for example, a solid, finely distributed, insoluble substance is selected as reaction component in the coating, only a record with very weak contrasts is obtained. The sharpest contrasts are obtained if the rate of diffusion and the concentration of the two components are such that the site of the reaction and thus the site of record formation in the coating depend heavily on the rate of flow, i.e. the supply of the components in the liquid.

It has been found that the formation of blue complex dyestuffs from bivalent or trivalent iron ions with ferricyanides or ferrocyanides respectively is particularly suitable for one embodiment of the invention. Potassium ferricyanide, for example, is incorporated in a thin gelatin coating applied to a carrier. The blue complex dyestuff forms quickly in a liquid bath containing ferrous ions, e.g. as iron$^{(II)}$ sulphate. The surprising discovery has been made that in a quiescent bath, i.e. without flow, and with selection of the correct concentrations, the dyestuff is produced exclusively in the liquid. In this case the coating itself remains completely uncoloured. On the other hand, if the liquid is moved relative to the coating surface, a blue colour, whose intensity increases as the rate of flow increases, is produced in the coating. The minimal rate of flow at which coloration of the coating starts, the sharpness of the increase and the maximum colour intensity can be controlled by modifying the concentrations of the reagents in the coating and liquid.

The blue coloration is always formed as a cohesive skin near the coating surface. This may be connected with the well-known property of the ferricyanide or ferrocyanide heavy metal complexes to form semi-permeable membranes. In this case such a membrane would act as barrier against the penetration of large ions, so that the concentration of the coloured complex on a limited area is promoted.

If a strip coated in this way is placed in a moving liquid bath, in which preferred flows of variable direction and speed occur at different points, the direction and relative rate of flow at different points can be seen by the eye after removing the strip.

An important application of the method is as a method of testing the conditions in photographic processing baths, especially in processing machines. In many photographic processes, especially colour processes with several successive treatment baths, the uniformity of the action of the liquids on the photographic coatings plays an important part and has both a qualitative and quantitative effect on the result. However, the evaluation of photographic results with regard to flow conditions in the machine is very troublesome, time-consuming and expensive, and in many cases an unequivocal interpretation is not possible.

By contrast, it is very easy to replace the photographic material by a film or paper carrier, which according to one form of the present invention is covered with a gelatin coating containing potassium ferricyanide, and to fill the machine to be tested with a solution of ferrous salt. A record of the flow conditions in the machine is obtained on the test material in a few minutes. After removal from the machine the test strip can be washed and dried and serves as reference material for the corrections to be made.

In other cases involving, for example, the investigation of flow conditions in agitator vessels, pipelines or the like, the surfaces to be checked can be covered with a test coating and dried. After feeding the liquid, the flow conditions at the treated surface strip are recorded visibly in the coating. A similar procedure can be adopted when testing model hulls. Generally speaking, carrier surfaces impermeable to the test liquid are employed.

The following Examples will serve to illustrate the invention:

EXAMPLE 1

In 15.900 kg. water of room temperature
0.035 kg. potassium ferricyanide $K_3Fe(CN)_6$ is dissolved. In this solution
1.500 kg. gelatin is allowed to swell for 30 min. at room temperature. The solution is heated to 50°C while stirring and left for one hour at this temperature, the gelatin dissolving completely. The solution is cooled to 40°C and the following substances added in the stated order:
0.440 kg. methanol,
0.675 kg. 2 percent saponin solution, and
0.450 kg. of a 10 percent solution of dimethyl urea.

In this way 19.000 kg. of a yellowish-green solution containing 1.84 g. potassium ferricyanide and 78.9 g. gelatin per kg is obtained; viscosity at 40°C : 11 cp.

By means of a film casting machine this solution is applied to a cellulose triacetate film at a coating weight of 85g. solution per $m^2$. After drying, a coated film containing 0.16 g. potassium ferricyanide and 6.71g. gelatin per $m^2$ is obtained.

The test apparatus for the cast and dried film is shown in FIG. 1 of the accompanying drawings. It consists of an open rectangular liquid tank 1, in which are located two rollers 2 and 3, arranged in parallel with vertical axes. A test strip 4 which is 900 mm. long and 35 mm. wide is cut from the film, joined to form an endless loop and tensioned over the rollers. Roller 3 is driven by the motor 5, the speed of which can be varied so that the film strip moves at a linear speed between 0 and 50 m/min. The liquid tank 1 is filled with 1.6 litres of a test liquid consisting of an aqueous solution of 1.0g. ferrous sulphate ($FeSO_4$) and 1 ml. hydrochloric acid (36 percent) per litre. The strip is allowed to move in the bath at speeds varying between 5 and 25 m/min. The bath temperature is constant at 24°C. Thereafter the strip is cut, removed, washed with water and dried.

Figure 2:
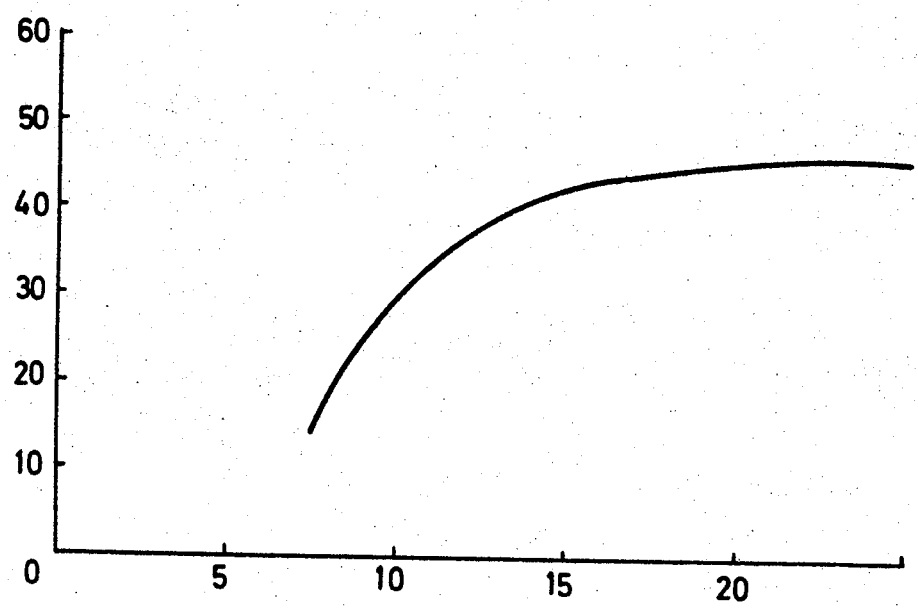

Apart from the outer edges, which have a somewhat patchy appearance due to the effects of flow, the strip is always a uniform blue colour. The optical density can be measured by a Macbeth-Mosley densitometer with Kodak filter No. 93. In FIG. 2 of the accompanying drawings the relative optical densities determined in this way are plotted on the ordinate against the linear speed of the strip (m/min) of the abscissa.

EXAMPLE 2

Instead of being applied on triacetate film the solution containing gelatin and potassium ferricyanide prepared in accordance with Example 1 is applied in the same thickness to different bases such as paper coated with a gelatin containing filling agents;
polyester film;
fibre fleece made from polyamide fibres, as used as a tear-resistant and water-resistant base for topographic maps.

The dried material can be tested in the same way as in Example 1 and produces a similar result.

EXAMPLE 3

The solution containing gelatin and potassium ferricyanide prepared in accordance with Example 1 is applied by a brush or spray gun or by immersion to the surface of an agitator element and then dried in a hot-air stream. By suitable movement of the agitator element it must be ensured that the coating thickness remains as uniform as possible on the entire surface during the drying process.

An agitator tank in which the agitator element is to be tested is filled with the solution described in Example 1, which contains 1.0g. ferrous sulphate and 1 ml. hydrochloric acid (36 percent) per litre of water. The agitator element is moved at the required speed during the test, subsequently removed and rinsed with water.

After drying, the areas exposed to a higher surface speed are coloured deep blue on the surface of the agitator element. Areas subject to a lower surface speed are lighter-coloured or even colourless. Under favourable conditions characteristic flow lines can be recorded visibly on the surface of the agitator element.

In the same way the walls of the agitator tank can be tested, and for example, flows at different agitator speeds made visible or the effect of baffles immersed in the liquid investigated.

EXAMPLE 4

A solution is prepared as follows:
100 g. gelatin and
20 g. of stabilised benzidine diazonium salt (BB salt) are stirred in
880 g. of water at 25°C. for 30 minutes. The suspension is then heated for a further 30 minutes to 40°C. in the process of which the previously swollen gelatin dissolves completely in water.
1000 g On a film casting machine this solution is applied uniformly with a thickness of 100g/$m^2$ to a triacetate film. After drying, the coated film is hardened in an aqueous formaldehyde bath and again dried.

An aqueous solution containing 5 g. of the disodium salt of 2-naphthol-3,6-disulphonic acid and 7 g. sodium in 10 litres is prepared.

The apparatus shown in FIG. 1 and described in Example 1 is filled with this solution. A strip of the coated, dried and hardened film material is mounted as an endless strip on the rollers as in Example 1. The strip is allowed to rotate for a few minutes before being removed from the bath, rinsed and dried. The strip is a uniform violet colour. The colour intensity increases within a test series as the strip speed increases.

If a solution containing 4g. resorcin and 6g. sodium carbonate in 10 litres is used instead of the solution of the 2-naphthol-3,6-disulphonic acid described above, the colour of the film strip is brown instead of violet and its intensity is also dependent on the running speed of the strip.

EXAMPLE 5

The film coated and dried according to Example 1 is treated with a solution of 1 g. copper sulphate per litre of water in the test apparatus. The colour of the strip is brown instead of blue, its intensity again being dependent on the strip speed.

We claim:

1. A method for manifesting the rate of liquid flow over a solid surface which comprises covering the surface with a thin coating of a film which contains a freely diffusible substance, and flowing over the coated surface a liquid which contains, dissolved therein, a substance which reacts with the diffusible substance to yield a reaction product that is visible in the coating and does not dissolve easily in the flowing liquid, the color density of the reaction product increasing with increased rate of liquid flow.

2. A method according to claim 1, wherein the material forming the coating can swell in the liquid, but is not dissolved by it.

3. A method according to claim 2, wherein the liquid is an aqueous solution and the material forming the coating is a hydrophilic compound of high molecular weight that can swell in water but is insoluble in water at the application temperature.

4. A method according to claim 3 wherein the hydrophilic compound is gelatin.

5. A method according to claim 4 wherein the gelatin coating contains a hardening agent to reduce its swelling capacity in the flowing liquid.

6. A method according to claim 1 wherein the reactive substances incorporated in the coating and dissolved in the liquid are compounds which react to form an azo dyestuff insoluble in the liquid.

7. A method according to claim 1 wherein the reaction substances incorporated in the coating and dissolved in the liquid are inorganic compounds which react together to form a reaction product insoluble in the liquid.

8. A method according to claim 7 wherein the substance incorporated in the coating is a soluble ferricyanide or ferrocyanide of an alkali metal and the substance dissolved in the liquid is a water-soluble salt of a bivalent or trivalent heavy metal.

9. A method according to claim 1, in which film, or paper is used as a carrier for the thin coating of the film-forming substance.

10. A method for testing the flow conditions in a photographic processing machine which comprises covering the surface of a photographic substrate with a thin coating of a film which contains a freely diffusible substance and flowing over the coated surface a liquid which contains, dissolved therein, a substance which reacts with the diffusible substance to yield a reaction product that is visible in the coating and does not dissolve easily in the flowing liquid, the color density of the reaction product increasing with increased rate of liquid flow.

11. A method for testing the flow conditions in a photographic processing machine which comprises coating the surface of a photographic substrate with a thin coating of a film containing potassium ferricyanide, and flowing over the coated surface a liquid containing a ferrous salt dissolved therein, to yield a colored reaction product that is visible in the coating and does not dissolve easily in the flowing liquid, the color density of the reaction product increasing with increased rate of liquid flow.

* * * * *